United States Patent [19]

Hopwell

[11] Patent Number: 4,469,030

[45] Date of Patent: Sep. 4, 1984

[54] STRUCTURAL JOINTS

[75] Inventor: Ernest E. Hopwell, Warwickshire, England

[73] Assignee: Linvar Limited, Leicester, England

[21] Appl. No.: 191,772

[22] Filed: Sep. 29, 1980

[30] Foreign Application Priority Data

Oct. 12, 1979 [GB] United Kingdom ............ 7935571

[51] Int. Cl.³ .................... A47B 41/04; A47F 5/14
[52] U.S. Cl. ................................ 108/28; 108/23; 211/182; 403/112
[58] Field of Search ............... 108/28, 92, 101, 59, 108/111, 23; 211/182; 403/109, 52, 112; 182/178

[56] References Cited

U.S. PATENT DOCUMENTS

| 744,701 | 11/1903 | Pederson | 403/112 |
| 1,281,104 | 10/1918 | Unger | 108/111 |
| 2,654,487 | 10/1953 | Degener | 182/178 X |
| 2,943,897 | 7/1960 | Johnson et al. | 108/23 X |
| 3,080,186 | 3/1963 | Grant | 403/112 |
| 3,604,734 | 9/1971 | Friedman et al. | 403/109 |
| 3,741,514 | 6/1973 | Snurr | 108/144 X |
| 3,908,565 | 9/1975 | Burnett | 108/147 |
| 4,105,239 | 8/1978 | Akczinski, Sr. | 294/19 R |

FOREIGN PATENT DOCUMENTS

| 84734 | 4/1958 | Denmark | 108/59 |
| 2300072 | 11/1973 | Fed. Rep. of Germany | 108/59 |
| 983424 | 2/1965 | United Kingdom . | |
| 1057955 | 2/1967 | United Kingdom | 403/12 |
| 1314275 | 4/1973 | United Kingdom . | |
| 1341569 | 12/1973 | United Kingdom . | |
| 1358425 | 7/1974 | United Kingdom . | |
| 2006297 | 5/1979 | United Kingdom . | |

*Primary Examiner*—James T. McCall
*Attorney, Agent, or Firm*—Buell, Blenko, Ziesenheim & Beck

[57] ABSTRACT

A tubular member 10 has another tubular member 12 slidable therein, and an insert 20 for locating the member 12 inside the member 10. A flange 14 on the member 12 carries a work top 16 of a work bench. The insert 20 prevents movement of the lower end of the member 12 in relation to the member 10, and so makes the whole structure rigid. The member 12 supports equipment such as a light 24.

1 Claim, 3 Drawing Figures

STRUCTURAL JOINTS

DESCRIPTION

The invention relates to structural joints for load bearing members, and is particularly but not exclusively suitable for upright frame members in metal furniture such as work benches.

The invention provides a structural joint comprising a tubular member, another member longitudinally slidable therein, a flange secured to the other member for determining the relative longitudinal positions of the members, and an insert secured to an end of the other member and fitting inside the tubular member for locating the other member in relation thereto.

The invention most advantageously provides a work bench having metal legs two of which are the tubular members in such a joint. The flange determines the relative longitudinal positions of the members by mounting a work top transversely in relation to the legs. The flange is generally screwed to the work top which rests on a main frame of the bench. The other member extends upward above the work top and can be used to support equipment such as light fittings, tool-holding bars, shelves, or louvred panels. The insert at the lower end of the other member is preferably of plastics material, and by locating the other member prevents movement of its lower end in relation to the tubular member and so makes the whole structure rigid.

DRAWINGS

Figure 1:
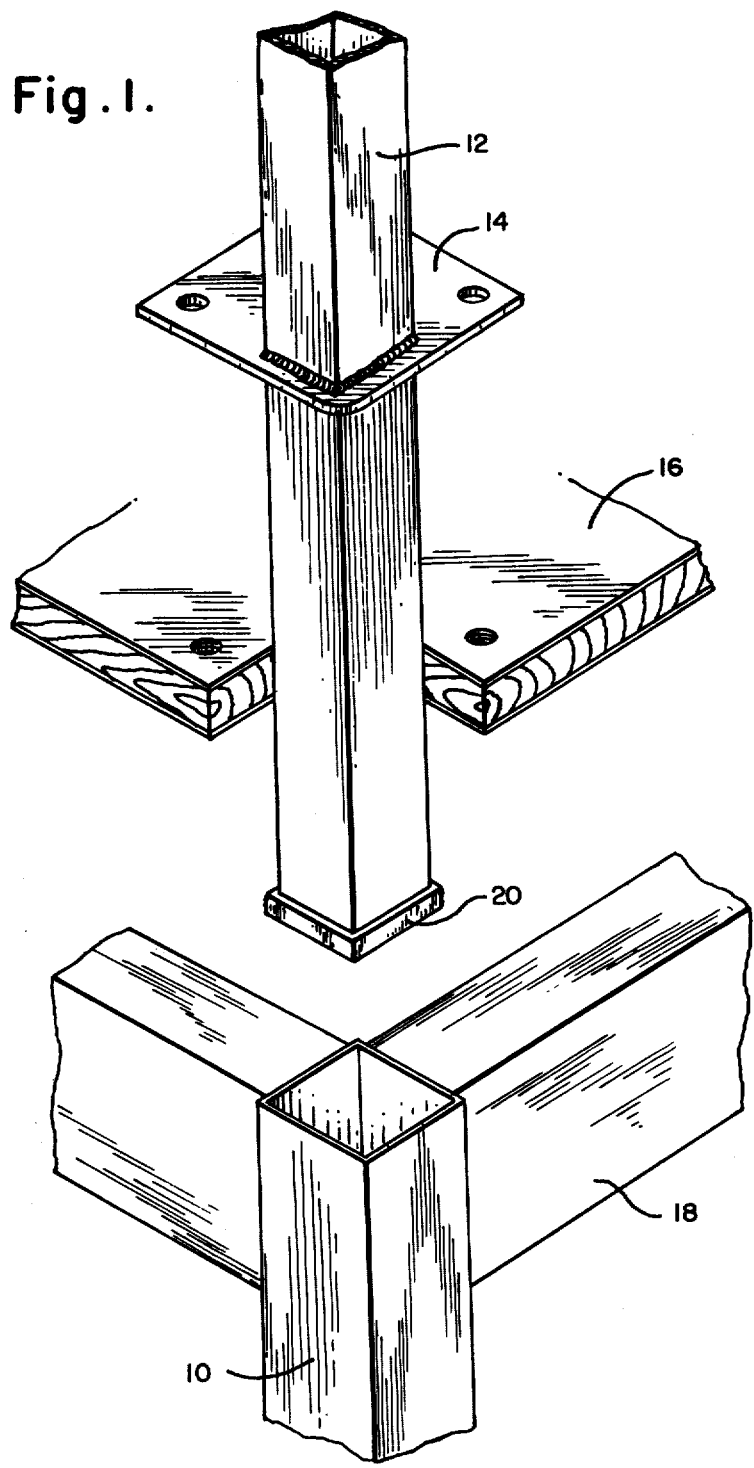
FIG. 1 is an exploded view of a structural joint according to the invention incorporated in a leg of a work bench.
Figure 2:
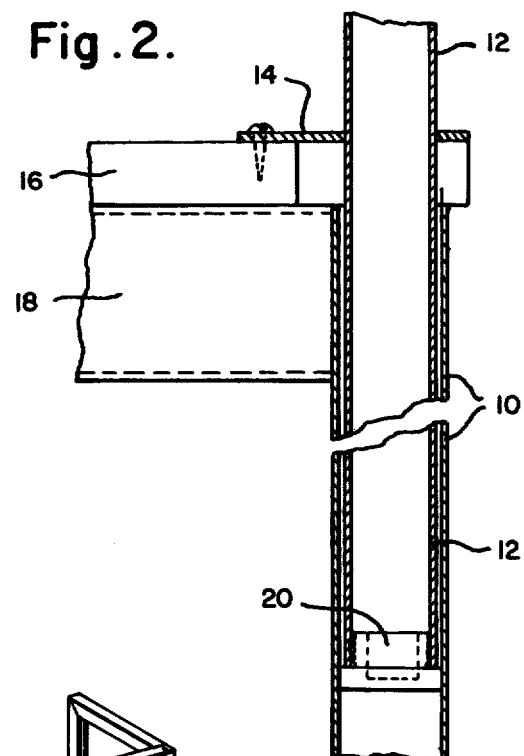
FIG. 2 is a vertical section through the joint of FIG. 1.
Figure 3:
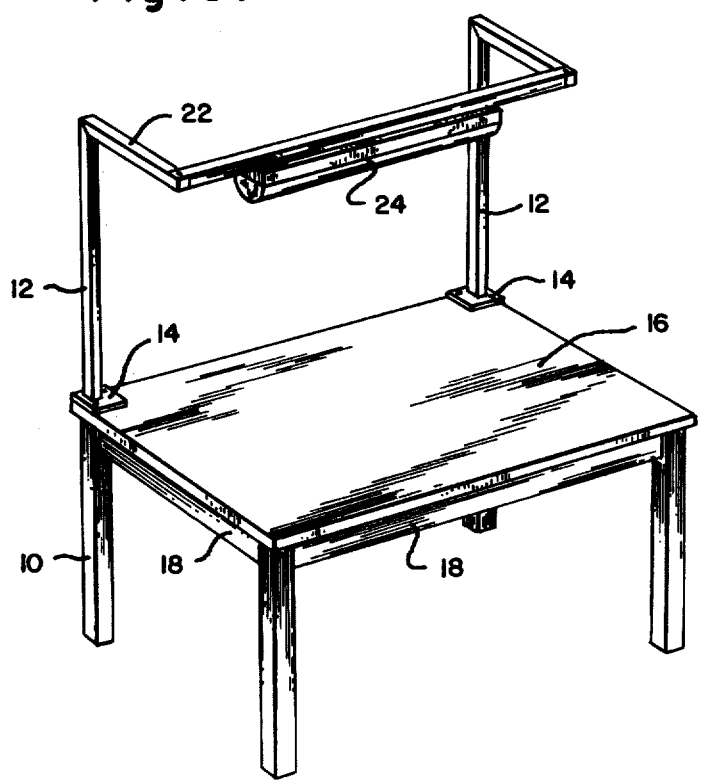
FIG. 3 is a perspective view on a smaller scale of a work bench having such joints in two of its legs.

With particular reference to FIG. 1, the joint comprises a square-section metal tubular member 10 which is a leg of the work bench. Another upright square-section metal tubular member 12 is longitudinally slidable inside the member 10. A flange 14 is welded to the upright 12, and determines the relative longitudinal positions of the members 10, 12 by resting (indirectly through a work top 16 screwed to the flange 14) on the open top end of the member 10 and a main frame 18 of the bench. A plastics insert 20 is pressed into the lower end of the other upright member 12, and is a sliding fit in the member 10, locating the upright 12 in relation to the member 10. The uprights 12 are connected together by an upper frame member 22 bearing a strip light 24.

I claim:

1. A work bench comprising a main frame at least two tubular metal legs secured to the main frame, a tubular frame member longitudinally slidable in each of the said legs, a flange secured to each said tubular frame member, a work top secured to the said flanges, the flanges and the work top determining the longitudinal positions of each of the said tubular frame members in the said legs, and a locating member secured to an end of each said tubular frame member and slidably fitting inside the corresponding leg for locating the said tubular frame member laterally in relation thereto.

* * * * *